Oct. 24, 1967   D. W. NEWTON ET AL   3,348,293
WIRE COIL INSTALLING TOOL

Filed May 12, 1966   3 Sheets-Sheet 1

Oct. 24, 1967  D. W. NEWTON ET AL  3,348,293
WIRE COIL INSTALLING TOOL
Filed May 12, 1966  3 Sheets-Sheet 2

United States Patent Office 3,348,293
Patented Oct. 24, 1967

3,348,293
WIRE COIL INSTALLING TOOL
David W. Newton, Bethel, and William D. Downing, Newtown, Conn., assignors to Heli-Coil Corporation, Danbury, Conn., a corporation of Delaware
Filed May 12, 1966, Ser. No. 549,556
5 Claims. (Cl. 29—240.5)

The present invention relates to tools for installing wire coil screw thread inserts in tapped holes of workpieces.

Such a wire coil screw thread insert is commonly formed of a length of wire which is generally diamond-shaped in cross-section, although other cross-sectional shapes are useful for this purpose as is well-known in the art. This wire is wound up spirally to form the coil that will thus have outer and inner screw thread forming portions of certain pitch and internal pitch diameter. Such a wire coil insert is also commonly provided with a diametrical driving tang extending at its root from the terminal end of the last turn or convolution of the coil insert, at the leading end of the latter, with this tang having a free end which may terminate at a point a certain radial distance from the longitudinal axis of the insert appreciably short of the opposed inner side of this last turn or convolution. Since conventionally such wire coil screw thread insert is formed by coiling the wire to have an outer diameter larger than the root diameter of the female thread of the tapped hole in the workpiece in which it is intended to be fitted, the installation thereof requires contraction of the coil insert before or during the installing action to afford locking action relative to such female thread after installation. Various types of tools have been designed for this purpose and the simplest thereof is of a type featuring a cylindrical spindle having a smooth outer surface, and provided with torque applying means at one end for manual rotation and a diametrical or transverse tang receiving or gripping slot at the other end, so that when the cylindrical body of this tool is loosely inserted within such wire coil screw thread insert the tang will be engaged in the transverse slot for applying driving torque to the insert as the tool is rotated.

While such a tool has proven to be useful in installing such insert, at times "cross-threading" is experienced during the installation. Cross-threading, i.e., bridging of a turn of the wire coil insert across a crest of the female thread in the tapped hole, occurs because a helical turn of the coil does not properly track in the female thread. Also with such an installing tool the installing action usually requires the use of one hand to hold the loose wire coil insert on the cylindrical tool shank while the other hand is occupied in applying torque thereto. An object of the present invention is to solve such problems, among others, in an efficient and simple manner.

It is another object to provide as one form of the present invention such a simplified manually operable tool which minimizes such a tendency of cross-threading and also requires the use of only one hand for effective insert installation, i.e., to apply the indicated torque, since this form of the present tool securely supports the wire coil insert in a manner efficiently preventing drop off.

A further object of the invention is to so provide the insert supporting head end portion of the tool with simpler tang engaging means for transferring the torque from the rotated tool to the insert during installing action by the provision of unusually simple abutment means for engagement by the diametrical tang to take the insert along with it when the tool is rotated, and which has associated therewith a relieved end surface permitting ready withdrawal of the tool front end from the tang and out of the wire coil insert after the latter has been installed upon rotation of the tool in the opposite retracting direction.

An additional object of the present invention is to provide all forms of the present wire coil installing tool with their torque transfer menas in the form of tang engaging and driving, longitudinally extending shoulders preceded by oblique peripheral ramps for progressive climb of the tang root corner of each insert, the required shaping of each tool mandrel to provide such torque applying shoulder and oblique circular ramp being uniquely simplified by simple removal or omission of the core of the tip end of the mandrel about which the ramp is circumscribed to eliminate need for complicated contour machining in the transition area.

The invention accordingly comprises the features of constructions, combination of elements, and arrangement of parts, which will be exemplified in the constructions hereinafter set forth.

Other objects of the invention will in part be obvious and will in part appear from reference to the following detailed description taken in connection with the accompanying drawings, wherein like numerals identify similar parts throughout, and in which.

Figure 1:
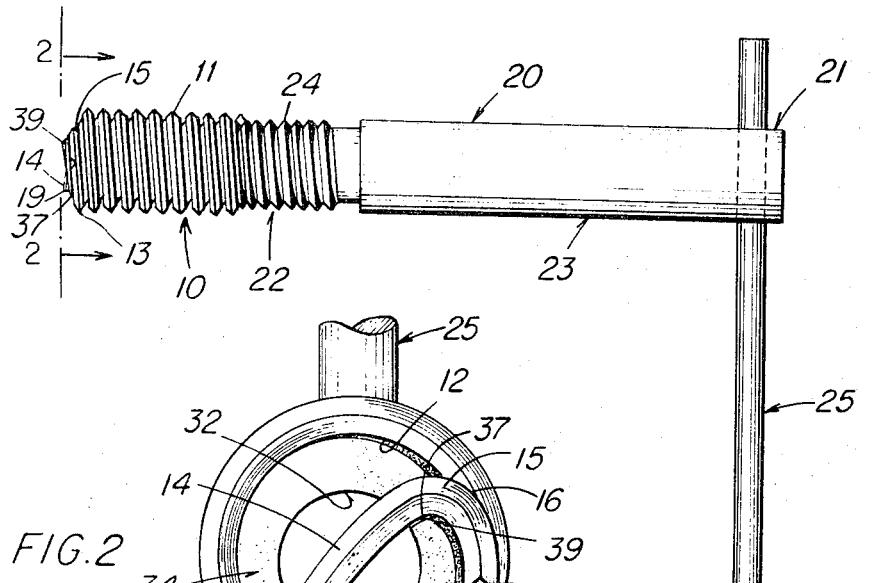
FIG. 1 is a side view of an embodiment of the inserting tool of the present invention for installing wire coil inserts in internally threaded holes formed in workpieces, showing such an insert loosely mounted on the externally threaded head end portion of the tool.
Figure 2:
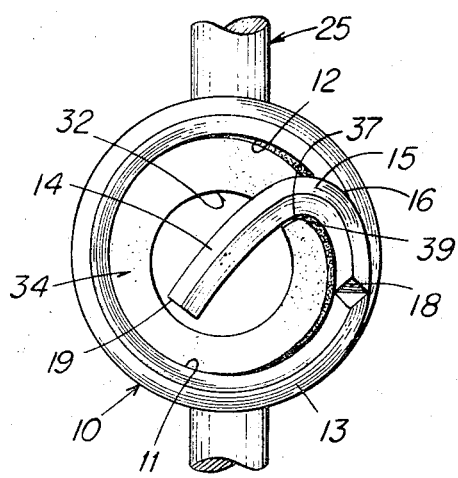
FIG. 2 is an enlarged end view, with parts broken away, of the structure shown in FIG. 1, taken substantially from the position of plane 2—2 of FIG. 1.

As is common knowledge in the art a wire coil insert of conventional type, such as that indicated at 10 in FIGS. 1 and 2, is coiled into a helix and has outer and inner screw thread forming portions or crests 11 and 12, as a result of the cross-sectional shape of such wire which may be substantially diamond-shaped. The outer and inner screw thread forming portions or crests 11 and 12 are respectively of certain outside and inside diameters as well as external and internal pitch diameters. The last turn or convolution 13 of such coil insert 10, at the leading end of the insert, is provided with a terminal portion which is shaped to form a diametric tang or grip end 14 extending at its root 15 from junction with the last turn or convolution. The root corner at 15 of the tang 14 is thus joined to a convolution arc 16 of the last turn 13 in which the wire is preferably provided with a cross notch 18 to facilitate break off of the tang after installation of the insert. The rounded root corner at 15 provides means for leading the lead end of the insert into the tapped hole with progressive contraction of the turns or convolutions of the insert since the outer diameter thereof initially is greater than the diameter of the internally threaded hole so as to assure snug anchorage of the insert in the tapped hole. The tang 14 has a free end 19 which terminates at a point that may be a certain radial distance from the longitudinal axis of the wire coil insert 10 appreciably short of the opposed inner side of this last turn or convolution 13.

A simple embodiment of the tool of the present invention, which is illustrated in FIGS. 1 to 6 inclusive of the drawings, for installation of such a wire coil insert 10 comprises an elongated tool body 20 having a driving portion 21, a generally cylindrical insert supporting head end portion 22, and an intervening shank portion 23 connecting the insert supporting portion to the driving portion for transfer of torque from the latter to the former about the longitudinal axis of the insert supporting portion. The insert supporting portion 22 is provided with an exterior male screw thread 24 to serve as a mandrel, with this thread being of a pitch substantially equal to that of the wire coil insert 10 and the internally threaded receptive hole of a workpiece, and of an external diameter appreciably less than the internal diameter of the insert to permit contraction of the turns or convolutions of the latter during torque installation thereof by this tool into the internally threaded receptive hole.

Means are mounted to the driving portion 21 of the tool 20 to apply driving torque thereto and consequently to the insert supporting portion or threaded mandrel 22. Since embodiments of the tool of the present invention are of a simple type particularly designed for manual installation of wire coil inserts the torque applying means may be of the form illustrated in FIGS. 1, 5 and 6 to consist of a manually engageable transverse bar 25 slidably inserted through a transverse hole 26 in the driving portion 21. The end of the tool driving portion 21 is provided with an axially-extending access hole 27 which extends to the transverse hole 26. A blind hole 28 extends axially from the transverse hole 26 forward to receive a helically coiled compression spring 29, which may or may not be covered by a detent ball 30 in the mouth of this blind hole. The detent ball 30 is held in the mouth of the blind hole 28 by a plurality of tongues 31 resulting from localized identations which may be formed by a suitable punching tool inserted through the access hole 27. Thus a spherical segment of the biased detent ball 30 is exposed in the transverse hole 26 to bear against a side of the handle bar 25 for holding it in a transversely adjusted position, preferably with end portions thereof extending from opposite sides of the tool driving portion 21 for applying torque thereto.

At least the leading end of the threaded insert supporting portion or mandrel 22 of the tool 20 is centrally relieved, such as by being provided with a longitudinal bore 32, which may be in the form of a socket or cylindrical blind hole, preferably extending into the threaded mandrel 22 coaxially thereof. If desired, such hole 32 may be provided as a leading section of a through bore extending coaxially through the entire tool body 20, plugged in any suitable manner at a suitable point to serve as abutment means for the inner end of the biasing compression spring 29. The coaxial hole 32 in the leading end of the threaded mandrel 22 converts the lead end of the latter to an externally threaded tubular flange 33 terminating in a circular edge 34. This circular edge 34 is spirally arranged along an appreciable extent of the crest 35 of the last turn or convolution of the thread 24 to provide an oblique circular ramp for riding beneath the tang root 15 when the wire coil insert 10 is placed on this threaded mandrel 22. The hole 32 may be of a diameter that will provide the circular flange edge 34 with an internal diameter sufficient to permit the terminal end 19 of the insert tang 14 to be located radially inward of the inner side of this circular edge (as defined by the wall of the bore 32), i.e., to be received by this hole, when the wire coil insert 10 is threadably mounted on the leading end of the threaded mandrel 22, as will be seen from FIG. 2. However, the tang 14 may be of such length as to cause its tip to overlie the inner edge of the spiraled ramp 34 when the tang root 15 is located in front of the terminal end of this ramp, in the manner hereinafter detailed.

Figure 3:
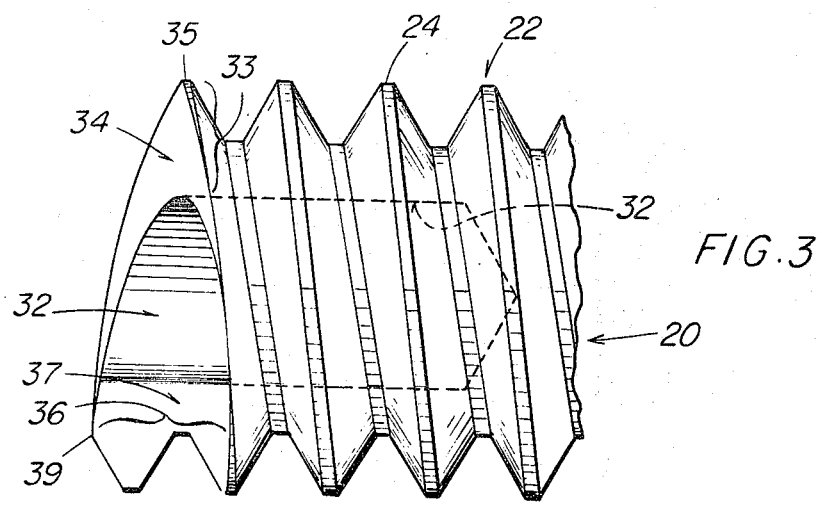
FIG. 3 is an enlarged detail side view, with parts broken away, of the leading end of the externally threaded head end portion of a tool similar to that illustrated in FIGS. 1 and 2, certain contouring of the torque applying shoulder being omitted.
Figure 4:
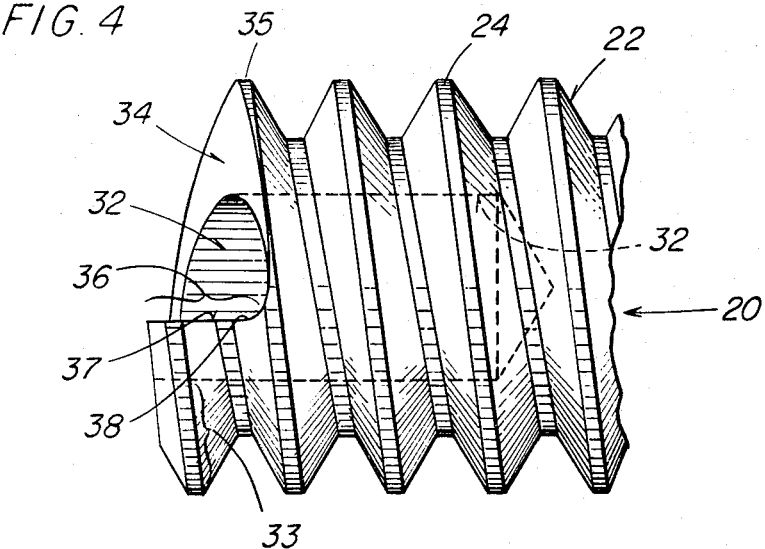
FIG. 4 is a side view similar to FIG. 3 of the structure shown in the latter as observed from a point about 90° to the point of observation of FIG. 3.
Figure 5:
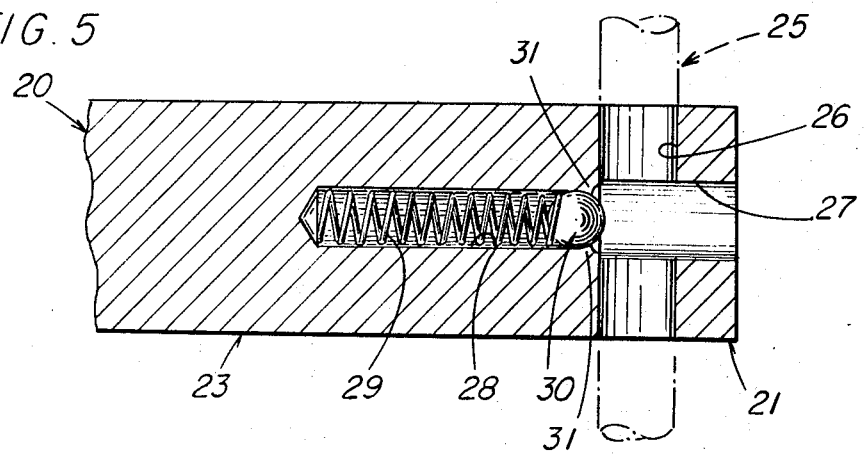
FIG. 5 is an enlarged axial section, with parts broken away and omitted, of the driving back end portion of the tool shown in FIG. 1.
Figure 6:
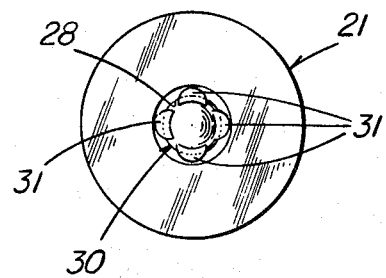
FIG. 6 is a right hand end view of the structure shown in full lines in FIG. 5.

The spirally arranged ramp 34 is stepped in an axially longitudinal direction, as is indicated at 36 in FIGS. 3 and 4, to define an abutment shoulder 37 for engagement by the inner side of the tang root at 15 to apply installation torque to the wire coil insert 10 when mounted upon the leading end of the externally threaded insert supporting portion 22. The wire from which any particular wire coil insert is formed is of a certain thickness in the direction of the axis of the insert coil as is dictated by the pitch and fineness of the threads in the workpiece tapped hole. Thus embodiments of the tool of the present invention should be provided with the tang engageable abutment shoulder 37 in a depth which is at least as great as, and preferably greater than, this wire axial thickness so as to assure maintenance of seating of the tang root thereagainst during application of the installation driving torque. The face of the abutment shoulder 37 may be substantially flat and arranged substantially parallel to and radial of the axis of the threaded insert supporting portion 22 of the tool. However, if desired, it may be contoured, i.e., provided with a medial transverse notch, so as to permit more secure seating thereagainst of the inner screw thread forming portion 12 of the insert wire. It is also desirable that for wire coil inserts designed to be installed in the internal threads of workpiece tapped holes which are characterized by fineness that the radially outer edge 38 of the abutment face 37 be chamfered back, preferably on a convex arc, for closer fit thereto of the bight intervening the convolution arc 16 and the tang or grip end 14 of the insert. For example, for National coarse threads in the size range of five-sixteenths of an inch (5/16")—18 to one and one-half inch (1½")—6, no such chamfering is required. However, it is desirable for National fine threads in the size range of five-sixteenths of an inch (5/16")—24, to one and one-half inches (1½")—12, such chamfering be employed and the degree thereof be progressively greater, such as that which may be provided on a radius within the range of twenty-five thousandths of an inch (0.025") to ninety-four thousandths of an inch (0.094").

Since it is preferable that the abutment shoulder 37 be of a depth greater than the coil wire axial thickness to assure secure seating of the tang root 15 thereagainst a rough rule of thumb may be followed for determination of a practical depth of such shoulder, i.e., about equal to one and one-half times the pitch of the external thread 24 carried by the threaded mandrel 22. It may also be desirable to have the spiraled edge or ramp 34 extend substantially through the circuitous length of the last full turn or convolution of the mandrel thread 24, i.e., from the vicinity of the bottom of the step to the top end 39 of the latter which defines this shoulder 37, in order to provide a gradual slope of low degree for the spiraled edge that will facilitate rotary sliding action of the tang root thereover and without appreciably changing the pitch of the last turn or convolution 13 of the insert in application thereof to the leading end of the threaded mandrel 22. When the tang root 15 is seated against the bottom portion of the abutment shoulder 37 in the mounting of the insert on the mandrel 22 there should be no appreciable variation in pitch of the last convolution 13 to interfere with ready tracking of the leading end of the arc 16 thereof into the mouth of the entry groove between the last convolution and the next preceding one of the internal thread of the workpiece tapped hole. In practice it has been found that ideally the contour cutting of the spiraled edge 34 may pass through the center line of the crest of the thread 24 just forward of the root of the abutment shoulder 37, as will be seen in FIG. 3, and progressively climb with substantially uniform slope to its topmost point 39 located within the root zone of any next succeeding convolution which might otherwise be present.

In use of the embodiment of the installing tool of the present invention illustrated in FIGS. 1 to 6 inclusive, properly sized for inserting a wire coil insert 10 of proper size into a particular internally threaded hole in a workpiece, such insert may be readily mounted on its externally threaded mandrel 22 by loose screwing action. If the internal diameter of the insert 10 is sufficiently oversized the insert may be simply dropped over the leading end of the threaded mandrel 22. If such loose screwing action is required, during the final phase thereof, the outermost tip at 39 of the spiraled edge 34 will pass beneath the tang root corner 15 and with further relative rotation this root corner will progressively slide down the sloped ramp provided by the circular edge 34 until the inner side of the tang root abuts against the bottom portion of the abutment shoulder 37, so that in the ultimate mounted position the inner side of the root of the tang will be abutted securely against the face of this shoulder substantially opposite the thread groove in this shoulder face. If the diametrical length of the tang 14 is such as to locate its tip end 19 over at least the inside zone of the spiraled ramp 34 during such rotary mounting of the insert 10 on the mandrel 22 the free end of the tang may be sprung slightly or canted outward to a small transverse oblique angle in the final seating of the insert on the mandrel 22, since the inner side of the tip end will be resting upon the ramp diametrically across the abutment face 37. In the event that the major axis of the insert wire at the tang root 15 is disposed opposite the thread groove in the abutment face 37 the wire major axis of the tang free end where it laps over the inside circular edge of the ramp 34 will be lifted only one-half the length of the minor axis of the wire, which will not undesirably affect the pitch of the last insert convolution 13. In the event that the tang 14 is shorter to dispose its tip end 19 radially inward of the ramp 34 this tip end will be received into the hole 32 in such final seated position of the insert 10 upon the mandrel 22 without any such canting of the tang 14. The relief of the core area of the leading end of the mandrel 22 by the provision of the hole 32 provides added clearance for the tang 14 and avoids necessity for complicated machine contouring in the transition area occupied by the mouth of this hole. The successive convolutions or turns of the wire coil insert will be loosely disposed about the leading end of the threaded mandrel 22 with proper tracking at all points. Location of the leading convolution 13 of the insert into the mouth of the internally threaded receptive hole of the workpiece by one hand manual manipulation of the tool 20 followed by rotation of the tool with this hand, will assure entry of the root corner at 15 into the mouth of the space intervening the last two successive convolutions of the thread of the hole. Continued application of torque to the tool 20 will progressively thread the insert into the threaded hole with progressive constriction of the successive turns. After the insert has been fully seated into the receptive threaded hole the threaded mandrel 22 of the tool may be easily backed out of the insert to leave the latter in installed position. Thereafter, the tang 14 and adjacent convolution arc 16 may be broken off at the notch 17 by inserting a rod into the centrally open portion of the insert to abutment of the tang and then by striking the extending end of the rod a sharp blow in the conventional manner.

Figure 7:
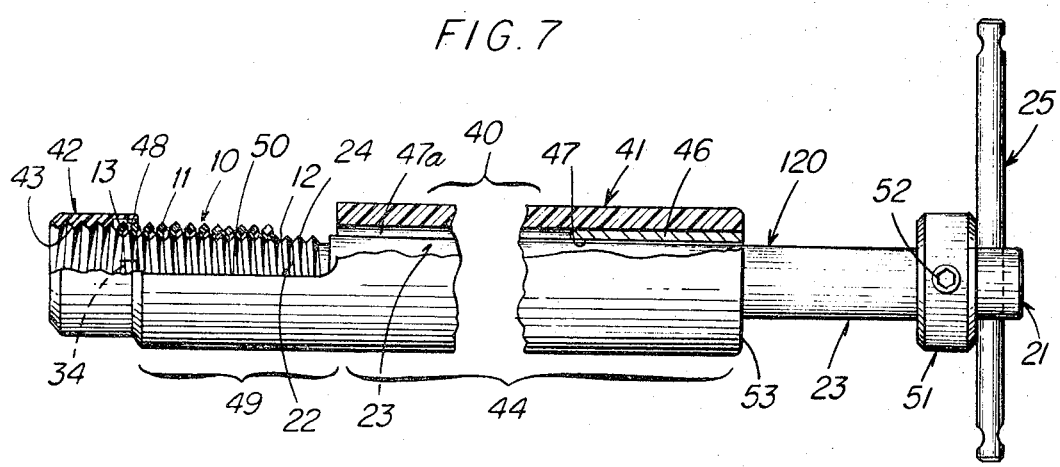
FIG. 7 is a view similar to FIG. 1 of another embodiment of the tool of the present invention, with parts broken away and in section.

In FIG. 7 is illustrated a modified form of a wire coil inserting tool embodying the novel features of the present invention. This tool 40 is of the prewinder type which first contracts the convolutions of the insert on the externally threaded mandrel portion thereof and then threadably installs the contracted insert into the internally threaded receptive hole of the workpiece. The inserting tool 40 comprises a tubular prewinder body or barrel 41 and an embodiment of the mandrel 120 of the present invention. The front end of the tubular body or barrel 41 is in the form of a prewinder tip 42 having an axial extension provided with at least one full turn of an internal thread 43, which may be of a diameter substantially the same as the diameter of the tapped hole in the workpiece which is to be lined with the wire coil insert 10. The main section 44 of the tubular body or barrel 41 may be made from suitable wear-resisting metal or any suitable rigid plastic and, as shown, may have its bore 47a lined with suitable wear-resisting sleeve structure. For example, the tubular barrel section 44 may be formed of suitable rigid plastic lined wholly or partially with a wear-resisting sleeve 46, which may be of steel, nylon, etc. Nylon is an excellent material to employ in producing the barrel 41 as a one-piece construction. The internal diameter 47 of the barrel section 44, or its sleeve lining, is slightly larger than the outer diameter of the mandrel intermediate section 23 and its mandrel section 22, so as to permit these sections to be readily inserted therethrough by sliding action.

The back end of the prewinder tip 42 preferably is provided with a counterbore 48 in which may be easily socketed the leading convolutions of the wire coil insert 10 from which the front end of the insert is to be readily fed into the internal thread 43 of the prewinder tip.

The prewinder tip 42 and the main barrel section 41 are intervened by a barrel section 49, one side of which is cut away to define a side loading slot 50 through which insert 10 will be loaded into this barrel section, to serve as a loading breach.

The shank portion 23 is provided with a suitable stop collar 51 adjustably secured thereto by any suitable means, such as a set screw 52, to limit the stroke of the mandrel through the barrel structure 41 by abutment of the rear end 53 of the latter when the insert 10 has been threaded entirely through the prewinder tip 42 into the receptive internally threaded hole in the workpiece.

Figure 8:
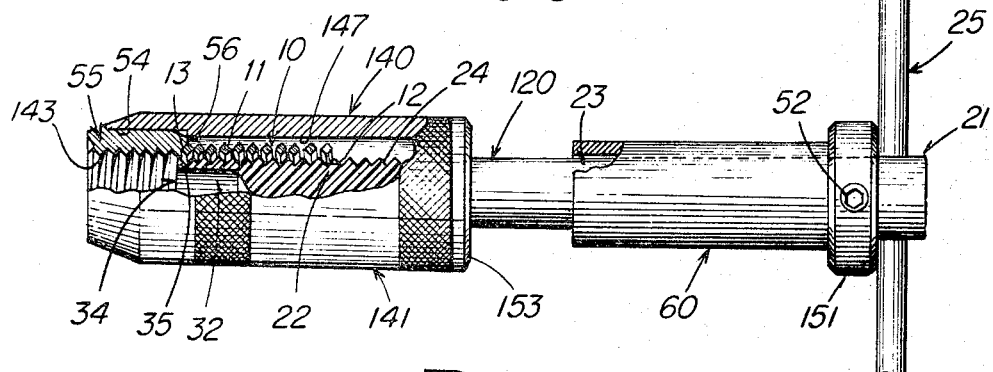
FIG. 8 is a view similar to FIG. 7 of a further embodiment of the tool of the present invention.
Figure 9:
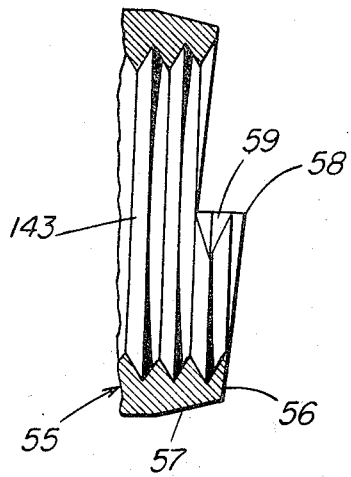
FIG. 9 is an enlarged axial section, with parts broken away, of the back end of the prewinder sleeve embodied in the structure of FIG. 8.

The mandrel of the present invention may be embodied in another type of prewinder tool, such as that indicated in FIGS. 8 and 9. In this tool 140 a tubular prewinder body or barrel 141 may be in the form of a sleeve having a through bore 147 which may be of an internal diameter appreciably greater than the external diameter of the threaded section 22 of the mandrel 120, into which insert 10 in relaxed condition readily may be slidably inserted through its open back end 153.

The front end of the barrel sleeve 141 may be counterbored at 54 to provide a socket into which an internally threaded prewinder sleeve 55 may be press fitted. The prewinder sleeve 55 is provided with one or more turns of an internal thread 143 which may be substantially the same size as the diameter of the tapped hole in the workpiece which is to be lined with the wire coil insert 10. The back end 56 of the prewinder sleeve 55 may be provided with a taper 57, as is shown in FIG. 9, to facilitate ready insertion into the counterbore 54 which is then to be seated to its mounted position by driving. The terminal end 58 of the last convolution of the internal thread 143 of the prewinder sleeve 55 may be relieved or throated, as is indicated at 59, to facilitate lead in of the first convolution 13 of the insert 10, and this feature may be embodied in the prewinder section 42 of the tool of FIG. 7, if desired.

It will be seen from FIG. 8 that the externally threaded section 22 of the mandrel 120 shown therein is of an outer diameter appreciably less than the inner diameter of the relaxed wire coil insert 10 for ready sliding insertion into the latter. The difference in the root diameter of the thread convolutions 24 of the FIG. 9 threaded mandrel section 22 and the root diameter of the thread convolutions 143 in the prewinder sleeve 55 is slightly greater than the thickness on the major axis of the wire from which the insert 10 is coiled. Thus, after the insert 10 is loosely dropped into the sleeve bore 147 with its tang end leading, the externally threaded front end section 22 of the tool mandrel 120 is freely inserted into this relaxed insert until its sloping front end surface 34 engages the insert tang. With continued application of axial thrust applied to the mandrel 120 it is rotated to cause the insert tang to slide up along the sloping end surface 34 until it is freed beyond the high point 39 after which the tang will recede to be opposed to the abutment face 37 as in FIG. 2. The insert will then be rotatably driven forward by rotation of the mandrel 120 for winding it into the constricting prewinder threads 143 of the prewinder sleeve 55 for guidance into the internal threads of the receptive hole in the workpiece. After the insert 10 is installed in this manner the mandrel may then be unthreadably withdrawn therefrom. If desired, the relative diameters of the insert 10, the sleeve bore 147 and mandrel 22 of the FIG. 8 embodiment may be such as to require that the mandrel be screwed into the insert in the free state before insertion of both into the sleeve bore or after the insert has been slid into the latter.

In the FIGS. 8 and 9 embodiment provision is made for guiding the mandrel 120 substantially coaxially with the loading barrel 141 and its prewinder sleeve 55. As is illustrated in FIG. 8 this guidance may be provided by means in the form of a cylindrical sleeve 60 telescoped over the mandrel shank 23 and having an outer diameter only slightly less than the inner diameter of the sleeve bore 147, for slidable reception into the latter. The guidance sleeve 60 preferably is provided with a stop head 151 adapted to abut the back end 153 of the barrel when the mandrel 22 is thrust and screwed forward therethrough. The sleeve 60 and its stop head 151 may be equipped with suitable means adjustably to mount them in a selected axial position on the mandrel shank 23, such as set screw 52.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

Having described our invention, what we claim as new and desire to secure by Letters Patent is:

1. A tool for inserting a wire coil insert having outer and inner screw thread forming portions of certain pitch and internal pitch diameter, and a diametrical tang extending at its root from the terminal end of the last convolution of said coil insert at the leading end of the latter, comprising:
    (a) an elongated tool body having a driving portion, a generally cylindrical insert supporting head end portion, and an intervening shank portion connecting said insert supporting portion to said driving portion for transfer of torque from the latter to the insert supporting portion about the longitudinal axis of the latter,
    (b) means mounted to said driving portion to apply torque thereto,
    (c) an exterior male screw thread carried by said insert supporting portion of a pitch substantially equal to that of the insert and of a pitch diameter appreciably less than the internal pitch diameter of the insert to permit contraction of the turns of the latter during torque installation thereof by said tool in an internally threaded hole of a workpiece,
    (d) at least the leading end of said threaded insert supporting portion being provided with a longitudinal hole to define an externally threaded tubular flange terminating in a circular edge,
    (e) said circular edge being spirally arranged along an appreciable extent of the crest of the last convolution of the thread of said flange to ride beneath the tang root when said insert is screwed onto said threaded insert supporting portion, and
    (f) a longitudinally-extending abutment shoulder for engagement by the tang root to apply installation torque to the insert when supported on said head end portion, and defined by an axially longitudinal step in said flange circular edge.

2. The tool as defined in claim 1 for installation of such wire coil insert, the wire of which is of certain thickness in the direction of the axis of the coil insert, characterized by said shoulder being of a depth greater than said wire axial thickness.

3. The tool as defined in claim 1 characterized by said shoulder being of a depth about equal to one and one-half times the pitch of the external thread carried by said insert supporting portion.

4. The tool as defined in claim 1 characterized by said spiraled edge extending substantially through the last full convolution of the thread carried by said insert supporting portion, from the vicinity of the bottom of said step to the top of the latter.

5. The tool as defined in claim 1 as is designed for mounting particular wire coil inserts in tapped holes with the tang of each insert having its free end terminating at a point a certain radial distance from the longitudinal axis of this insert, characterized by said longitudinal hole in the leading end of said insert supporting portion being cylindrical and coaxially located with its diameter being sufficient to locate said spiraled edge radially outward of the tang free end of each such insert for reception thereof by said cylindrical hole when the root of this tang is positioned in front of said tool abutment shoulder.

References Cited

UNITED STATES PATENTS

| | | | |
|---|---|---|---|
| 2,453,840 | 11/1948 | Geertsema | 29—240.5 |
| 2,584,118 | 2/1952 | Forster | 29—240.5 |
| 3,093,895 | 6/1963 | Eddy | 29—240.5 |

WILLIAM FELDMAN, *Primary Examiner.*